United States Patent [19]

Kunitsyn et al.

[11] 4,171,104

[45] Oct. 16, 1979

[54] APPARATUS FOR CONVEYING AND TRANSMUTING METAL CHIPS

[75] Inventors: Valery A. Kunitsyn; Mirsaid M. Rakhimkulov, both of Kazan, U.S.S.R.

[73] Assignee: Kazansky Aviatsionny Institut Imeni A. N. Tupoleva, Kazan, U.S.S.R.

[21] Appl. No.: 917,935

[22] Filed: Jun. 22, 1978

Related U.S. Application Data

[63] Continuation of Ser. No. 776,113, Mar. 10, 1977, abandoned.

[30] Foreign Application Priority Data

May 10, 1976 [SU] U.S.S.R. ............................ 2361714

[51] Int. Cl.² ............................................ B02C 18/16
[52] U.S. Cl. .................................... 241/160; 241/200; 241/243
[58] Field of Search ................. 241/74, 160, 190, 200, 241/243

[56] References Cited

U.S. PATENT DOCUMENTS 2,711,834  6/1955  Broberg et al. .................. 241/200 X

FOREIGN PATENT DOCUMENTS 528821  8/1956  Canada ...................................... 241/200
46-8074  of 1971  Japan ........................................ 241/200

Primary Examiner—Howard N. Goldberg
Attorney, Agent, or Firm—Lackenbach, Lilling & Siegel

[57] ABSTRACT

The apparatus features a conveying means with rakes and other blade members for coarse crushing the chips. The conveying means is in the form of a chain conveyor contained in a trough. The members for coarse crushing of the chips consist of inverted L-shaped grapples, the leading edges of which have a curvature, and of blades, the cutting edges of which face the leading edges of the grapples and are provided with a curvature having a radius which is about equal to the radius of the curvature of the leading edge of each grapple. The blades are fitted to the inside surface of the trough, in at least two rows, above a zone traversed by the chain conveyor, so that the grapples pass between the rows of blades. The inverted L-shaped grapples are suitably attached to links of the chain.

8 Claims, 9 Drawing Figures

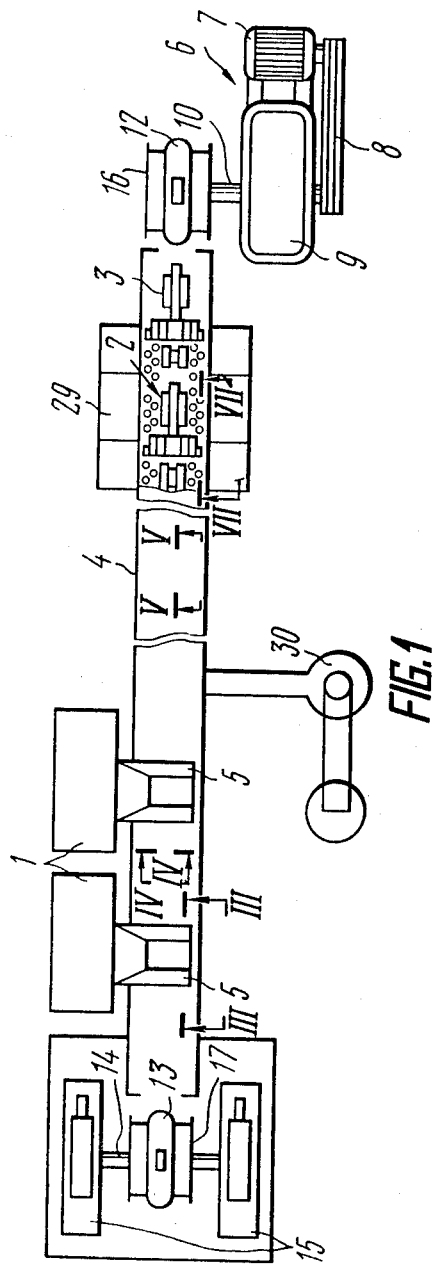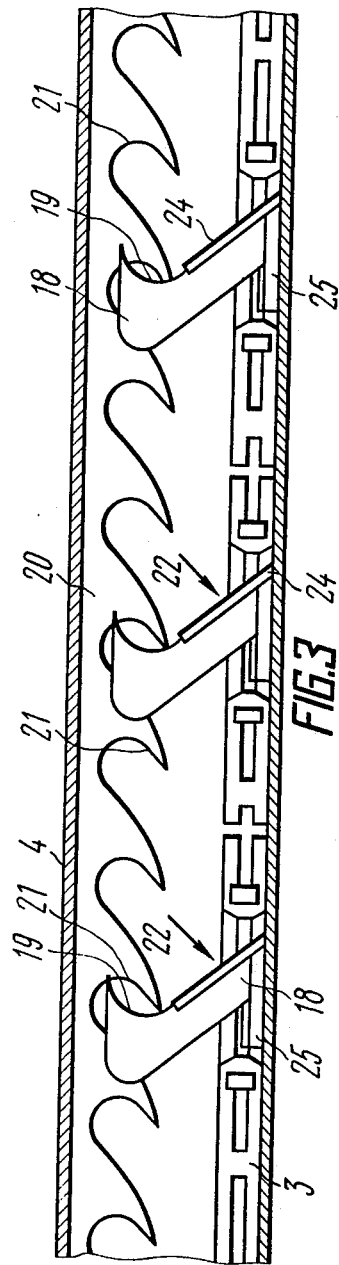

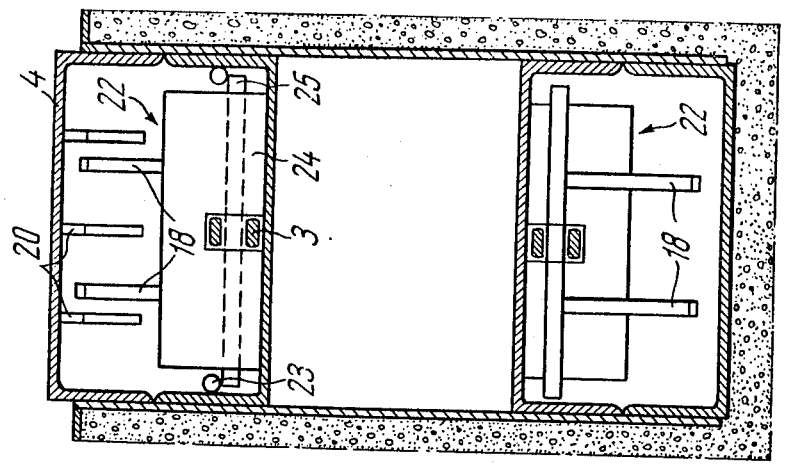
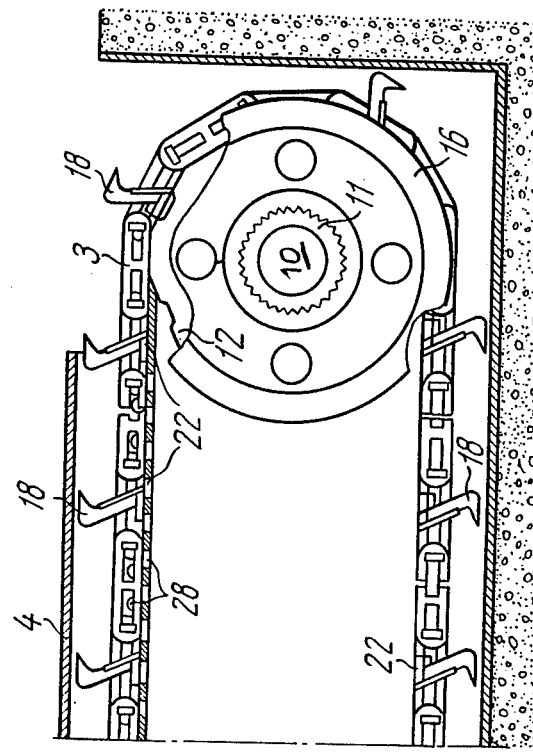

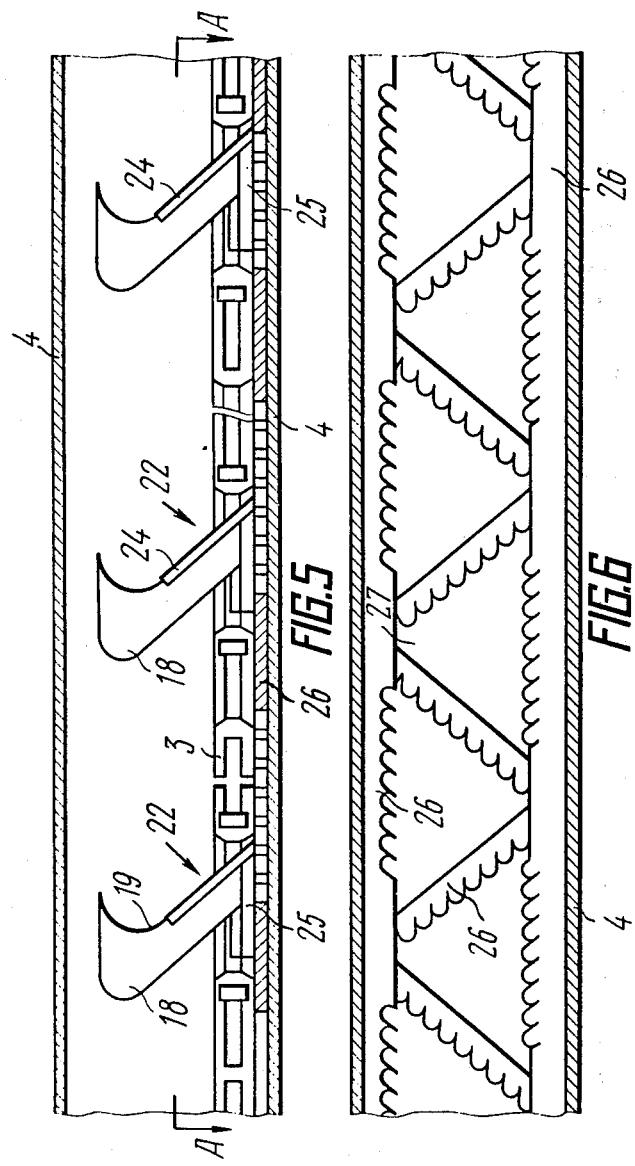

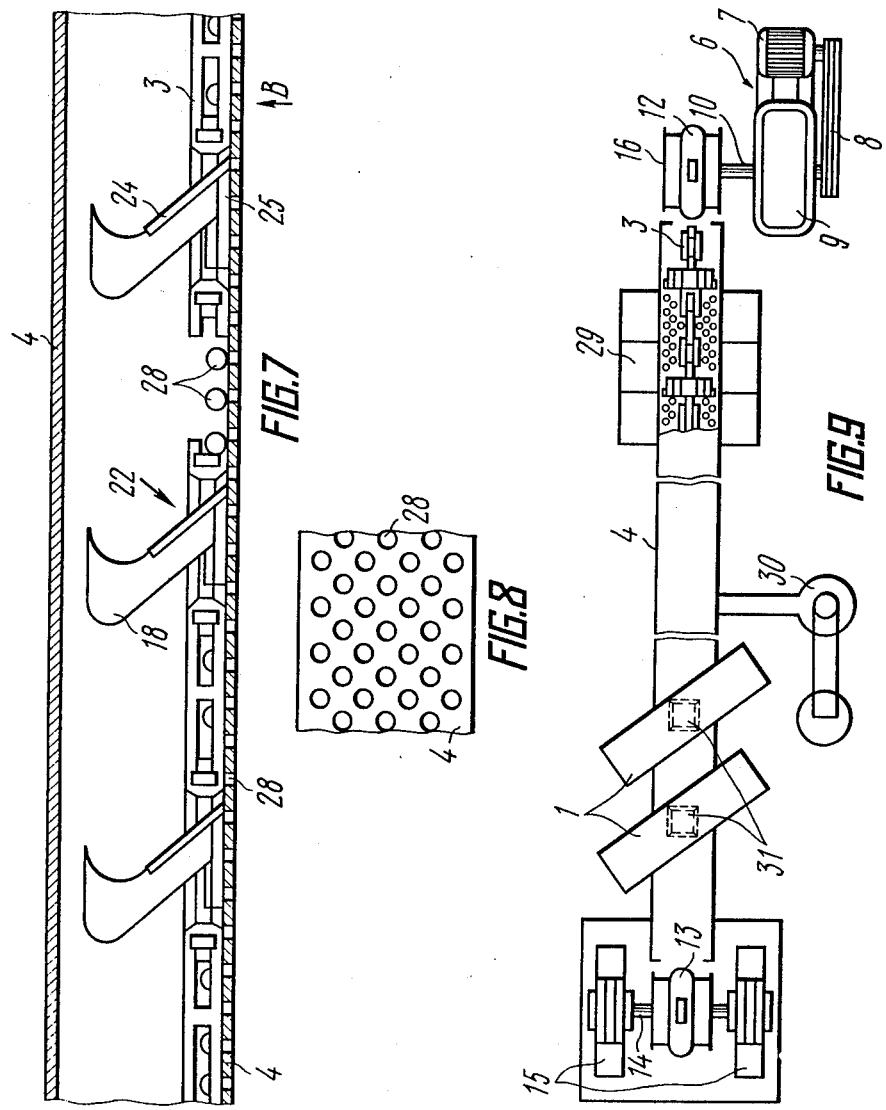

APPARATUS FOR CONVEYING AND TRANSMUTING METAL CHIPS

This is a continuation of application Ser. No. 776,113, filed Mar. 10, 1977, now abandoned.

FIELD OF THE INVENTION

The present invention relates to apparatus for utilizing chips, and, more specifically, to apparatus for conveying metal chips and transmuting same by crushing. It may be used to advantage in machine works where chips pile up in tremendous amounts, especially continuous steel chips in the form of flexible rods or tight coils, of varying lengths and discontinuous steel chips which may consist of coarse spirals with a cross section between 40 and 60 mm$^2$ or single-turn spirals of the same cross-sectional area, which is apt to cause them to intertwist into a shapeless tangle which will collapse under pressure. The stock removed in machining commonly averages between 10 and 20% of the workpiece weight and is in the 40 to 50% bracket in special cases.

In the engineering industry, the problem of disposing of chips involves hard work and is both time and labor-consuming. It is almost invariably solved by emplying a large labor force whose productivity is low. The lack of modern means of mechanization enabling a continuous removal of chips from machine tools, from work areas and from the floors of shops results in a cluttering up of the floor or work area which, in turn, is extremely likely to cause serious accidents.

On the other hand, proper transmuting of metal chips provides for thrifty usage of them in foundries of machine works as a substitute for costly scrap. Furthermore, as is well known, when machining metal, use is made of costly cutting oil and, since some of this oil is carried away with chips, it stands to reason that steps should be taken to reclaim this oil for further use.

DESCRIPTION OF THE PRIOR ART

In recent years saw efforts to treat the conveying and transmuting of metal chip as two aspects of a single problem have resulted in disclosing an apparatus incorporating a means of conveying with raking members and members for crushing of the chips. The means of conveying is a rake conveyor having a rod which is contained in a trough and reciprocates back and forth, by means of a hydraulic cylinder operating in conjunction with a hydraulic pump and an electric motor. The members for crushing of the chips are blades attached to the rod and blades fitted to the inside surface of the trough. In cross section, the rod is provided with three blades extending radially to its surface above the cross pieces so as to form clearances in the tangential direction with the blades attached to the trough at a pitch varying with the length. The cutting edges of the rod blades and those of the trough blades are directed in opposite directions. In addition, there claws are on the inner side of the trough for retaining chips or making the chips immovable during the backward displacement of the rod. Guides are included along which the cross pieces are moved. The raking members are hinged to the rod at a pitch remaining constant along the length and they serve to convey chips during the forward, or working, stroke of the rod. When the rod is on the backstroke, the raking members pivot due to the resistance of the chips and slide along the chip. Thus, the chip is being conveyed only during the forward stroke of the rod and remains static or immovable during the backstroke. Crushing of the chips in the known conveyor takes place due to the passing of the rod blades between the trough blades, the chips as a result being ruptured and broken.

In any apparatus for conveying metal chips and transmuting same by crushing where the means of conveying is the rake conveyor, such arrangement impairs the capacity of the apparatus because the rod has backstrokes which are idle strokes. In addition, the drive used in conjunction with the rake conveyor is very intricate so as to invite operational difficulties and, moreover, it is rather bulky. To assure normal functioning of the rake conveyor, its trough must be of a considerable cross section. This feature calls for alloting a floor area of considerable size when the conveyor is being floormounted or requires wide ducts enabling its servicing when the conveyor is installed below the floor. Furthermore, the efficiency of the rake conveyor is low, because much of the power is consumed during the backstrokes, and the crushing of chip is not likely to exceed the 10-percent limit in the rake conveyor. Finally, in the known apparatus the blades of the rod have rectilinear cutting edges which fail to guarantee that continuous or discontinuous steel chips are is caught so as to be fed toward the blades of the trough (a factor also impairing the capacity of the apparatus ). Another disadvantage is that the known apparatus provides for the random reduction of chip size while the steel industry gives preference to metal chip reduced to a very specific size.

SUMMARY OF THE INVENTION

It is an object of the present invention to provide an apparatus for conveying and transmuting chips, which ensures the conveying of any metal chip over any distance as well as processing of it in a reliable way by crushing, which features a simple and compact drive, a trough of small cross section and a high output rate with good efficiency.

Another object of the present invention is to increase the yield of crushed chips to at least 85–95% by breaking and crumpling.

A further object of the present invention is to produce chips crushed to a size suitable for use by the steel industry.

Still a further object of the present invention is to recover cutting oil for further use.

In accordance with these and other objects, the invention pertains to an apparatus for conveying metal chips and transmuting same by crushing incorporating conveying means, in the form of a chain conveyor with rakes, and members for crushing chips. The means for crushing chips comprises inverted L-shaped grapples, which are attached to links of the chain and have curved leading edges, and blades, which are fitted in at least two rows within a portion of the length of a top surface of the trough above a zone traversed by the chain conveyor so that the inverted L-shaped grapples pass between the row blades when the chain of the conveyor is set into motion. A cutting edge of each blade faces the leading edges of the grapples and has a curvature with a radius approximately roughly corresponding to the radius of the curvature of the leading edge of each grapple.

The use of the chain conveyor, which is both simple and reliable, as the means of conveying provides for a high output rate of the apparatus, inasmuch as the chain conveyor is free from overloads since a chain has only a forward stroke, which is the working stroke. In addition, the chain conveyor is capable of transporting chips over very long distances.

The members for crushing chips are in the form of inverted L-shaped grapples and blades the curvature of the cutting edges of the blades corresponding to the curvature of the leading edges of the grapples and the cutting edges of the blades facing the leading edges of the grapples so as to ensure hooking of the chips in a reliable way and crushing of same by breaking. The explanation is that the cutting edges of the blades and the leading edges of the grapples define a closed zone when the chain conveyor is moving and no chip can escape therefrom nor from not being broken therein.

When at least one grapple dragging a chip passes between two blades, the chip is broken and vigorously shaken at the same time with the result that the cutting oil spread thereon drips off. This enables an almost 100-percent recovery of cutting oil for further use.

It is preferable that the blades be serrated. This feature adds to the output rate of the apparatus for transmuting metal chips because breaking is effected by all the cutting edges of the serrated blades.

It is also preferable that each rake be made up of two plates arranged at an angle to each other so that one of the plates is located in a plane parallel to the bottom surface of the trough and that the width of each plate corresponds to the width of the bottom surface.

It is also preferable that the apparatus for conveying and transmuting metal chips be provided with additional means for further and finer crushing of chips in the form of combs disposed within a portion of the length of such means is the bottom surface of the trough successively to the blades. The combs define, in a plan view, triangular pockets across the width of the bottom surface, the depth of each pocket being sufficient to ensure crushing of the chips by crumpling and breaking. Teeth of the combs face a direction which is opposite to the direction in which the rakes are progressing. This arrangement is conducive to increasing the yield of finely crushed chips to between 70 and 75%, the crushing being effected not only by breaking but also by crumpling. The chips dragged along by rakes drop into the pockets, wherein they are crumpled by these plates of rakes which are parallel to the bottom surface, the finer chips being expelled and moving toward the teeth of the combs where they are broken by the edges of the rakes. Thus, the crumpling of the chips also results in a partial breaking of them.

It is preferable that the apparatus for conveying and transmuting metal chips be provided with still other members for final crushing of the chips. These members are perforations located in a checkered pattern on the bottom surface of the trough successively to the combs and on a portion of the side surfaces of the trough. The diameter of the perforations is anywhere between 20 and 30 mm. This arrangement provides for a 85- to 95-percent yield of chips reduced to the size specified for use in the steel industry. As the chip crushed by the combs is dragged along by a rake into that portion of the side and bottom surfaces of the trough which is provided with perforations, it is subject to further crushing between the edges of the perforations and the edges of the rakes followed by sieving through the perforations. The checkered pattern of the perforations provides for a sufficiently high rate of sieving combined with complete crushing.

The present apparatus for conveying metal chips and transmuting same by crushing enables comprehensive mechanization of the processes of conveying, crushing, sieving and stocking chips along with the recovery of costly cutting oil for further use. The apparatus disclosed may find utility at machine works as a reliable and simple means of mechanizing said processes dealing with chips of of any cross section and any length, including continuous and discontinuous chips.

The apparatus is of a simple and reliable construction that basically consists of standard components; that is, the trough of the apparatus is of a small cross section, for example, 300 mm by 400 mm, no rubbing components, such as the rake retainers, rake plates, rake edges and bottom surface of the trough require lubrication, the apparatus is free from any length limitations, yields finely crushed quality chip, lends itself to installation in any existing machine shop without interfering with the production tempo, poses no maintenance problems and displays a high rate output.

BRIEF DESCRIPTION OF THE DRAWINGS

Other objects and advantages of the present invention will be best understood from the following description of a preferred embodiment of the invention, when this description is read in conjunction with the accompanying drawings in which:

FIG. 1 is a schematic plan view of the apparatus of the invention;

FIG. 2 is a schematic view of the drive sprocket and a length of the chain with rakes and grapples;

FIG. 3 is a sectional view along the line III—III of FIG. 1;

FIG. 4 is a sectional view along the line IV—IV of FIG. 1;

FIG. 5 is a sectional view along the line V—V of FIG. 1;

FIG. 6 is a sectional view along the line A—A of FIG. 5;

FIG. 7 is a sectional view along the line VII—VII of FIG. 1;

FIG. 8 is a sectional view of a portion of the trough looking in the direction of arrow B in FIG. 7 illustrating the perforations on the bottom surface of the trough; and FIG. 9 is a schematic plan view of the apparatus of the invention shown running under machine tools.

DETAILED DESCRIPTION OF THE INVENTION

Referring to FIG. 1, the apparatus for conveying metal chips and transmuting same by crushing is installed at floor level along a line of machine tools. In accordance with the invention, the apparatus incorporates conveyor means in the form of a chain conveyor 2 with rakes and members for the crushing of chips. The working run or work surface 3 of the conveyor 2 is accommodated in a trough 4. Each of the machine tools is provided with a chute 5 which feeds chips onto the chain conveyor 2. The conveyor is set into motion by a drive 6 consisting of an electric motor 7 and a reducer 9 interconnected by a belt 8. Fitted to a shaft 10 by means of an overload coupling 11 (FIG. 2) is a drive sprocket 12 interacting with the chain conveyor 2 which, in turn, also interacts with a driven sprocket 13. The shaft 14 on which the sprocket 13 is mounted is linked up with a tensioner 15. The drive sprocket 12 operates and is positioned in a housing 16 which adjoins the trough 4 and serves to protect the sprocket from possible damage caused by chips. The driven sprocket 13 is protected by housing 17 which also adjoins the trough 4. The crushing members comprise inverted L-shaped grapples 18, (FIG. 3) whose leading edges 19 have a curvature, and blades 20, which are serrated blades having teeth with a constant serration pitch of, for example, 200 mm and have cutting edges 21 facing the leading edges 19 of the grapples 18. The cutting edge 21 of each blade 20 is given a curvature whose radius is approximately equal to the radius of the curvature of the leading edges 19 of the grapples 18. The grapples 18 are attached to links of the chain conveyor 2 at a constant pitch of, for example, 960 mm and the blades 20 (FIG. 4) are fitted in at least two rows to a top surface of the trough 4 above a zone traversed by the chain conveyor 2, so that the inverted L-shaped grapples 18 pass between the rows of blades when the chain conveyor 2 is set into motion. Also attached to links of the chain conveyor 2 are rakes 22 whose pitch corresponds, for example, to the pitch of the grapples. Fitted to the inside surface of the trough 4 are rake retainers 23 which prevent the rakes from raising due to interaction with the chips deposited at the bottom of the trough 4. Each rake 22 (FIG. 5) is made up of two plates 24 and 25 arranged at an angle to each other so that one of the plates 25 is located in a plane parallel to the bottom surface of the trough 4 and the width of both plates corresponds to the width of the bottom surface.

The apparatus is further provided with additional members for a finer crushing of the chips, which members are combs 26 (FIG. 6) disposed within a portion of the length of the bottom surface of the trough 4 successively to the blades 20 (FIG. 3) so that their teeth project in the direction opposite to that in which the rakes 22 (FIG. 5) progress. The combs 26 define triangular pockets 27 (FIG. 6) across the width of the bottom surface having a depth which must be sufficient to assure the crushing of chips by crumpling and breaking actions. As the combs 26 are disposed on the bottom surface of the trough 4, the plates of the rakes 22 move along the combs. Therefore, as the rakes move the chips, the chips rub against the combs and are crushed or ruptured by such action.

Furthermore, in accordance with the invention, the apparatus is provided with still other members for the final crushing of chips, which members are perforations 28 (FIG. 7) located in the bottom surface of the trough 4 successively to the combs 26 (FIG. 6) as well as in a portion of side surfaces of the trough 4 (FIG. 7). The perforations 28 are arranged in a checkered pattern which provides for rapid sieving and reliable crushing of the chips the diameter of each perforation 28 being anywhere between 20 and 30 mm.

Placed under that portion of the trough 4 which is provided with the perforations 28 are bins 29 (FIG. 1) which collect the chips which fall through the perforations. The apparatus is provided with a means 30 for reclaiming cutting oil communicating with the trough 4 at the end of the zone wherein the breaking of the chips takes place.

The apparatus can be installed at floor level under machine tools 1 (as shown in FIG. 1 and FIG. 9). In that case, the chip pan of each machine tool is provided with a port 31 communicating with the trough 4. When a machine tool 1 is in operation, the port 31 of its chip pan is closed by a lid thus preventing cutting oil from draining into the trough 4.

The apparatus for conveying metal chip and transmuting same by crushing operates as follows. As soon as a sufficient quantity of chips has accumulated in the chutes 5 (FIG. 1) of the machine tools 1, the drive 6 of the conveyor 2 is activated with the result that the drive sprocket 12 starts rotating, thus setting into motion the chain conveyor 2. If the chain stops, say by being impeded by a piece of metal, such as steel, which has entered the trough by accident, the overload coupling 11 (FIG. 2) is activated.

Moving integrally with the chain conveyor 2 are the grapples 18 which, due to their inverted L-shape, firmly hook the chips contained in the chutes 5 and drag them through the loading ports of the trough 4. In moving further with the hooked chips, the inverted L-shaped grapples 18 (FIG. 3) pass between the stationary blades 20 (FIG. 4) with the result that the chips are ruptured. Such action is accompanied by vigorous shaking of the chips, and the chips are crushed into coarse particles by breaking effected in a closed zone defined by the leading edges 19 of the grapples 18 (FIG. 3) and by the cutting edges 21 of the blades 20. The vigorous shaking of the chips causes the cutting oil spread thereon to drip off so that almost 100% of the oil can be reclaimed in the reclamation means 30 (FIG. 1) and reused. The ruptured and coarsely crushed chips drop to the bottom of the trough 4 where they are hauled by the rakes 22 toward the pockets 27 (FIG. 6). As the rakes 22 move the chips towards the pocket 27, the chips pass over the combs 26, thus causing a further crushing of the chips. On dropping into the pockets 27, the chips are crumpled therein by those plates 25 of the rakes 22 which are arranged in a plane parallel to the bottom surface, the coarser particles expelling from the pockets 27 the finer ones which move toward the teeth of the combs 26 where they are broken by the edge of each passing rake 22. The crumpling of the chips also causes partial crushing of them, and at this stage between 70 and 75% of the chips are crushed to a fairly small size. On being crushed by the combs 26, the chips are hauled by rakes 22 into that zone of the trough 4 wherein a plurality of perforations 28 (FIG. 7) is provided for. Here, further crushing of the chips takes place between the edges of the perforations 28 and the edges of the passing rakes 22 followed by sieving through perforations 28. The fine chips passing through these perforations drop into the bins 29. The chips too big to pass through the perforations 28 are further ground down by the interaction caused by the chips being squeezed between the bottom of the trough 4, where the perforations 28 are defined, and the rakes 22. Such grinding reduces the chips to a size which is small enough to pass through the perforations. Those chips which are still too big are recycled. About 85-95% of the chips remaining are crushed to a size capable of being used in the steel industry.

Although the present invention has been described in some detail by way of illustration and example for purposes of clarity of understanding, it will, of course, be understood that various changes and modifications may be made in the form, details, and arrangements of the parts without departing from the scope of the invention as set forth in the following claims.

What is claimed is:

1. An apparatus for conveying and transmuting chips by crushing comprising conveying means in the form of a chain conveyor having links; a trough for loading and transmuting said chips having said conveying means disposed in it; rakes attached to said links of said conveying means; a plurality of inverted L-shaped grapples, each grapple having a leading edge provided with a curvature for coarse crushing of said chips, attached to said conveying means; blades for coarse crushing of said chips fitted in at least two rows within a portion of a top surface of said trough above said rakes so that said L-shaped grapples pass between adjacent rows of said blades when said conveying means is set into motion, a cutting edge of each of said blades facing said leading edges of said grapples and having a curvature whose radius is approximately equal to the radius of the curvature of said leading edges of each of said grapples.

2. An apparatus as claimed in claim 1, wherein each of said rakes is made in the form of two plates arranged at an angle to each other, one of the plates being located in a plane parallel to a bottom surface of said trough, the width of each of said plates corresponding to the width of said bottom surface of said trough.

3. An apparatus as claimed in claim 1, wherein said blades are serrated blades.

4. An apparatus as claimed in claim 3, wherein each of said rakes is made in the form of two plates arranged at an angle to each other, one of the plates being located in a plane parallel to a bottom surface of said trough, the width of each of said plates corresponding to the width of each bottom surface of said trough.

5. An apparatus as claimed in claim 4, further comprising additional members, for a finer crushing of said chips, in the form of combs disposed within a portion of said bottom surface of said trough successively to said blades, said combs defining triangular pockets across the width of said bottom surface, the teeth of said combs facing a direction opposite to the direction in which said rakes are progressing, the depth of each pocket being sufficient to ensure the crushing of said chips by crumpling and breaking.

6. An apparatus as claimed in claim 5, further comprising other members for the final crushing of said chips which are perforations located in said bottom surface of said trough successively to said combs and in a portion of side surfaces of said trough.

7. An apparatus as claimed in claim 6, wherein said perforations in said bottom surface of said trough are arranged in a checkered pattern.

8. An apparatus as claimed in claim 6, wherein the diameter of said perforations is approximately between 20 and 30 mm.

* * * * *